United States Patent Office 3,275,690
Patented Sept. 27, 1966

3,275,690
PROCESS FOR THE PRODUCTION OF AROMATIC AMINES WHICH ARE ALKYLATED ON THE NUCLEUS
Rudolf Stroh and Hans Haberland, Leverkusen-Bayerwerk, and Willi Hahn, Cologne-Stammheim, Germany, assignors to Farbenfabriken Bayer Aktiengesellschaft, Leverkusen, Germany, a corporation of Germany
No Drawing. Filed Nov. 1, 1962, Ser. No. 234,865
Claims priority, application Germany, Jan. 22, 1955, F 16,634; July 14, 1955, F 17,936, F 17,937; Aug. 13, 1955, F 18,193; Aug. 24, 1955, F 18,261
24 Claims. (Cl. 260—576)

This invention relates to the production of alkylated aromatic amines by reacting an aromatic amine and an olefin. This application is a continuation-in-part of application Serial No. 560,057, filed January 19, 1956, now abandoned.

United States Patent 2,762,845, assigned to the assignee of the instant application, discloses a procedure for production of alkylated aromatic amines by reaction of aromatic amines and olefins, the said procedure being characterized in that aluminum or aluminum alloys can be used to catalyze the alkylation reaction. The instant application differs from the said patent in respect to the materials which can be used to catalyze the reaction. In the said patent, and also in the instant application, the concern is with alkylation of the nucleus of the aromatic amine.

According to the present invention, an aromatic amine is nuclearly alkylated by reacting an olefin of the group aliphatic olefins and cycloolefins with an aromatic amine at a temperature of about 150–400° C., and in the presence of a Friedel-Crafts catalyst.

The effectiveness of Friedel-Crafts catalyst in the process of the invention is surprising. Whereas it is known that aromatic hydrocarbons, e.g. benzene, can be alkylated with olefins under very mild conditions in the presence of Friedel-Crafts-catalysts (see for example Charles Allen Thomas, "Anhydrous Aluminum Chloride in Organic Chemistry" (1941), page 459 seq.), it is believed that this reaction is facilitated by the formation of unstable complexes of the olefins and the aluminum chloride (see page 458 of the above-cited reference). In contrast thereto the amino group of primary and secondary amines forms with the aluminum chloride a stable complex. This complex is so stable that under the reaction conditions of the aromatic hydrocarbons no alkylation of the aromatic amine is obtained. Thus, the art does not teach nor suggest that aromatic amines can be alkylated with olefins in the presence of aluminum chloride.

The literature teaches similar results if the alkylation is carried out in the presence of borfluoride (see D. Kastner, "Angewandte Chemie," vol. 54 (1941), page 273 et seq., especially page 281).

In Klages, "Lehrbuch der organischen Chemie," vol. 1 (1913), page 932, it is stated that for Friedel-Crafts reactions only anilines with a tertiary amino group are suitable, and the compounds with a primary or secondary amino group should preferably first be acylated at the nitrogen atom.

Other prior art teachings appropriate to acknowledge are U.S. patent Schollkopf 2,115,884, and Lavrovskii et al., Chem. Abstracts, vol. 43, page 4644 (1949). Schollkopf uses a bleaching earth catalyst and effects alkylation of less than 10% of the aniline treated. Lavrovskii uses mixtures of aluminum and silicon oxides as catalyst and obtains very low yields. The process of the invention provides high yields, e.g. 90%.

In the process of the invention, the olefin can be a lower aliphatic olefin, e.g. aliphatic olefin having up to about 5 carbon atoms. The olefins of interest are the normally gaseous olefins, such as ethylene, propylene, butylene-1, butylene-2, and isobutylene. As indicated, the olefin can be a cycloolefin. Cyclohexene is an exemplification of the cycloolefins suitable for the purposes of the invention. Olefins such as styrene are not contemplated by the invention.

The amines which are of particular interest for the process of the invention are the unsubstituted, alkyl-substituted, and halogen-substituted primary and secondary amines. The amine can be aniline or naphthylamine, amine derivatives which are substituted in the nucleus by alkyl groups such as for example toluidines and xylidines. Halogen-substituted amines can be used. For example, the amine can be o-chloroaniline. The amine can be a secondary amine, e.g. diphenylamine. Also, diamines, such as m-phenylenediamine, a toluylene diamine, such as 2,3-diaminotoluene, 2,4-diaminotoluene, 2,5-diaminotoluene, 2,6-diaminotoluene, 3,4-diaminotoluene, 3,5-diaminotoluene, and benzidine, can be used. Sym.-xylidine (dimethylaniline-3,5) can be used. Olefins such as styrene are not contemplated for use in the process of the invention.

The catalyst used according to the invention are Friedel-Crafts catalysts. The catalyst can be: aluminum chloride, aluminium bromide, iron chloride, boron fluoride, zinc chloride, or tin tetrachloride. This group of catalysts can also include sulfuric acid, and phosphoric acid. The preferred catalyst is aluminum chloride.

The above-mentioned patent 2,762,845 teaches alkylation of the nucleus of aromatic amines using aluminum in the process. The aluminum forms an aluminum anilide, and the alkylation reaction then occurs upon the contacting of olefin with the aromatic amine containing the aluminum anilide. According to the invention, a Friedel-Crafts catalyst can be used to advantage in combination with a catalyst according to said Patent 2,762,845. It has been found that just as aluminum facilitates the alkylation with Friedel-Crafts catalyst, so also do the alkali and alkaline earth metals. Thus, materials which act in the manner in which aluminum acts are lithium, sodium, potassium, rubidium, cesium, barium, calcium and strontium. In the utilization in the instant invention of aluminum or alkali metal, or alkaline earth metal, the metal-amine compound of the aluminum, alkali, or alkaline earth metal can be prepared in the manner described in said Patent 2,762,845 for providing aluminum anilides. Instead of using the metal for making the anilide, a compound of the metal which will provide the anilide can be used. Thus, in the case of aluminum, aluminum hydride or aluminum alkyls can be used. In the production of the anilides, such as aluminum anilides, activators, such as for example mercuric chloride can be employed. Where a metal amine compound, such as is described here, is used, it is desirable to use the metalamine compound of the amine which is to be alkylated. The metal-amine compound of a different amine can, however, be used.

If in the use of metal-anilides, such as aluminium anilide, the anilide is of an amine other than the amine which is to be alkylated, in general the amine which is not chemically bound to the aluminum is alkylated first, and the metalanilide compound is not alkylated until after alkylation of the free amine is complete, and the alkylation of the metal anilide can be effected by employing more vigorous reaction conditions. Thus, a mixture of m-phenylenediamine and aluminum anilide, can be converted to a mixture of alkylated m-phenylenediamine and aluminum anilide. The alkylation can then be terminated, the supply of olefin stopped, and the aluminum anilide destroyed to yield aniline, so that the aniline can be recovered unchanged while alkylated m-phenylenediamine is recovered as product.

Further, with respect to the catalyst, a mixture of a Friedel-Crafts catalyst and a bleaching earth can be used (fuller's earth and bentonites).

If the Friedel-Crafts catalyst is used without addition thereto of other catalyst material as is described above, especially good results are obtained if the alkylation is carried out with propylene or higher olefins.

The catalyst employed should be free of any materials as would act to poison the reaction. Thus, the catalysts empolyed should not contain sulfur as would poison the reaction. The catalyst can be a sulfur-free catalyst.

The process of the invention can be carried out by contacting the olefin as a gas with the aromatic amine as a liquid. In so carrying out the process, the olefin will in general be introduced into the amine under a superatmospheric pressure. The pressure can be in the range of about 50–300 atmospheres, more commonly 100–300 atmospheres. Pressures above and below the range of 50–300 atmospheres can be used. During the reaction, the pressure drops, and, advantageously the pressure is maintained by continuous or other suitable manner of addition of olefin.

The temperature for the reaction can be in the range of about 150–400 degrees C.

The ratio of olefin to amine taking part in the reaction will generally be in the range of about 1–3. The number of alkyl radicals entering the amine molecule depends on the temperature, pressure, amount of olefin, the nature and amount of catalyst, and the reaction time employed. Generally, absorption and reaction of about 2 mols of olefin per mol of amine provides a suitable reaction. The alkylation can be stopped before the taking up of the upper limit of amine for the reaction conditions, and in such cases, a mixture of mono-alkylated and di-alkylated amines can be obtained.

If the positions ortho to the amino group are unoccupied in the aromatic amine, it is predominately alkylation of the o-position which takes place. In particular cases, another free position in relation to the amino group can additionally be occupied.

The alkylation is mainly effected in the nucleus of the aromatic amine and only in part on the nitrogen atom. It is almost exclusively alkylation on the nucleus which takes place at relatively high temperature and especially when using a mixed catalyst, as is demonstrated by the following table which shows the results of the propylation of aniline at different temperatures, wherein as catalyst is used:

(a) 2% of aluminum chloride and
(b) a mixture of 2% of aluminum chloride and 2% of aluminum anilide.

| Catalyst | N-isopropyl aniline, mol percent | 2-isopropyl aniline, mol percent | N,N-diisopropyl aniline, mol percent | 2,6-diisopropyl aniline, mol percent | 2,4,6-triisopropyl aniline, mol percent | aniline conversion, percent |
|---|---|---|---|---|---|---|
| Reaction temperature 250° | | | | | | |
| (a) | 20.8 | 28.0 | 18.0 | 15.8 | 0 | 85.0 |
| (b) | 0 | 33.6 | 0 | 3.1 | 0 | 38.5 |
| Reaction temperature 300° | | | | | | |
| (a) | 20.3 | 31.7 | 0 | 14.5 | 0 | 71.8 |
| (b) | 0 | 59.0 | 0 | 27.3 | 0 | 88.6 |
| Reaction temperature 340° | | | | | | |
| (a) | 0 | 40.3 | 0 | 18.0 | 4.5 | 67.2 |
| (b) | 0 | 46.0 | 0 | 14.8 | 0 | 69.1 |

The use of the mixed catalyst has the further advantage that the polymerization of the olefins to resins and liquid higher hydrocarbons is repressed. Especially good results are obtained by using the mixed catalyst comprising aluminum with aromatic amines and aluminum halides. Good results are also obtained using mixed catalysts comprising the alkali and alkali earth metals with aromatic amines and aluminum halides. Other mixtures of the catalysts can be used.

It is generally sufficient if 0.5–10% by weight of the catalyst is added to the amine to be alkylated, but larger or smaller amounts can in many cases also be used to advantage. If a mixed catalyst is used which consists of a Friedel-Crafts-catalyst and aluminum or aluminum compounds or alkali or alkaline-earth metals or their amines, the second catalyst can be added to the Friedel-Crafts catalyst in an amount of 10–100% (calculated on the Friedel-Crafts catalyst). When alkylating aniline, for example, excellent results are obtained by using a mixed catalyst consisting of 6% of aluminum chloride and 2% of aluminum or sodium, calculated on the amount of amine being acted.

The process can be carried out continuously or batchwise. For continuous operation, the catalyst is preferably dissolved or suspended in the amine to be alkylated and this suspension or solution is pumped by a high-pressure pump through a pipe system which is heated to reaction temperature, while ethylene or another suitable olefin is simultaneously forced in under pressure. More olefin is pumped in at the rate of which the pressure decreases, so that a constant olefin pressure is always maintained. After passing through the reaction zone, the reaction product is cooled in a high-pressure cooler and continuously discharged by way of a relief valve.

The working up of the reaction products takes place in the usual manner, for example, by decomposing the reaction mixture with water, making the mixture alkaline and separating the amine mixture from the reaction mixture, or by distilling over with stem. The crude amines can then be further worked up by fractional distillation.

By means of the novel process, good yields are obtained of the o-substituted, o,o'-substituted and o,o'-p-trisubstituted alkyl amines which have previously only been made on a small scale and have not been readily available. They form valuable intermediate products for the manufacture of dyestuffs, auxiliaries for rubber and plastics, pharmaceutical products, textile auxiliaries and pest-control agents and as additives for mineral oils and fuels.

The invention is further described in the following examples. In these examples, all parts are parts by weight, unless otherwie indicated.

In the examples various substitutions are possible. Thus, as the aromatic amine, there can be used naphthylamine, benzidine, naphthylamine, o-chloroaniline, xylidines, m-phenylenediamine; and, as catalysts there can be used aluminum bromide, iron chloride, silicon tetrachloride, sulfuric acid, phosphoric acid; instead of aluminum, aluminum alloys can be used.

EXAMPLE 1

*Aniline, propylene, aluminum chloride*

300 parts of aniline are heated in an autoclave to 300° C., in the presence of 6 parts of aluminum chloride. By means of a high-pressure pump propylene is injected up to a pressure of 250 atmospheres. A vivacious reaction takes place. At the rate the pressure decreases, fresh propylene is introduced. After 7 hours the absorption of propylene is 0.88 mol per 1 mol of aniline. The raw produce is treated with water, rendered alkaline with caustic soda solution and the crude amine mixture is separated and distilled in fractions. Resins in small quantities are formed as by-products which can be separated for the most part by filtration. By distilling the crude amine mixture 20.3% of N-isopropylaniline, 31.7% of isopropylaniline and 14.5% of 2,6-diisopropylaniline are obtained. 71.8% of the aniline applied are converted.

EXAMPLE 2

*Aniline, propylene, aluminum chloride*

By repeating the process of Example 1 at 340° C., the propylene absorption is 1.07 mols per 1 mol of aniline; 40.3% of 2-isopropylaniline, 18.0% of 2,6-diisopropylaniline and 4.5% of 2,4,6-triisopropylaniline are obtained.

EXAMPLE 3

*Aniline, ethylene, aluminum chloride*

300 parts of aniline and 6 parts of aluminum chloride are heated to 340° C.; ethylene is injected so as to reach and maineain a pressure of 250 atmospheres. The consumption of ethylene within 4 hours is 0.3 mol per one mol of aniline. Upon working up 70% of the aniline applied are recovered and 25% of 2-ethylaniline are obtained, apart from a low amount of higher alkylated anilides.

EXAMPLE 4

*Aniline, propylene, zinc chloride*

300 parts of aniline and 6 parts of zinc chloride are heated to 340° C. Proplene is introduced up to a pressure of 250 atmospheres and the pressure is maintained by introducing fresh propylene at the rate the pressure decreases. 46.7% of the aniline are converted within 4 hours and 7% of N-isopropylaniline, 23.1% of 2-isopropylaniline and 4.5% of 2,6-diisopropylaniline are obtained.

EXAMPLE 5

*Aniline, propylene, tin tetrachloride*

When carrying out the process of Example 4, replacing, however, zinc-chloride by tin tetrachloride, similar conversion rates and yields are obtained.

EXAMPLE 6

*Aniline, propylene, boron fluoride*

300 parts of aniline and 6 parts of boron fluoride are treated with propylene at 250° C. at a pressure of 250 atmospheres. The pressure soon decreases but is increased again to 250 atmospheres by introducing fresh propylene. 0.55 mol of propylene is absorbed per one mol of aniline within 4 hours. The reaction product is decomposed with water, separated off and rectified. 53% of the aniline used are reacted, and 18.8% of N-isopropylaniline, 5.1% of N,N-diisopropylaniline, 23.7% of 2-isopropylaniline and 3.3% of 2,6-diisopropylaniline are obtained.

EXAMPLE 7

*Aniline, propylene, boron fluoride*

When carrying out the process of Example 6 at 340° C., 65.1% of the aniline are reacted, and 35.3% of 2-isopropylaniline and 16.2% (of the theoretical) of 2,6-diisopropylaniline are obtained; N-isopropylanilines are not formed.

EXAMPLE 8

*Aniline, isobutylene, aluminum chloride*

200 g. of aniline are heated together with 8 g. of aluminum chloride to 300° C. Isobutylene is then introduced up to a pressure of 250 atmospheres.

1.33 mols of olefin are absorbed per mol of aniline within 4 hours. By distilling the reaction product 41.9% of a mono-tertiary-butylaniline (B.P. 110° C. under 10 mm. Hg) and 7.1% of a di-tertiary-butylaniline (B.P. 136° C. under 10 mm. Hg) are obtained.

EXAMPLE 9

*Aniline, isobutylene, aluminum chloride*

When the process of Example 8 is carried out at 200° C., 1.58 mols of olefin are absorbed per mol of aniline within 5 hours. 50.3% of a mono-tertiary-butylaniline (B.P. 110° C. under 10 mm. Hg) and 35.8% of a di-tertiary-butylaniline (B.P. 136° C. under 10 mm. Hg) are obtained.

EXAMPLE 10

*Aniline, isobutylene, aluminum chloride*

When the process of Example 8 is carried out with a mixture of 200 g. of aniline mixed and 32 g. of aluminum chloride, within 4 hours 2.18 mols of isobutylene are absorbed and 50.8% of mono-tertiary-butylaniline and 40.8% of di-tertiary-butylaniline are obtained.

EXAMPLE 11

*Aniline, isobutylene, bleaching earth and aluminum chloride*

200 g. of aniline are heated to 200° C. together with 20 g. of bleaching earth and 8 g. of aluminum chloride. Isobutylene is introduced up to a pressure of 250 atmospheres. The amount of olefin consumed per mol of amine is 1.92 mols; 37.7% of a mono-tertiary-butylaniline and 47.2% of a di-tertiary-butylaniline are obtained.

EXAMPLE 12

*Aniline, isobutylene, boron fluoride*

200 g. of aniline and 8 g. of boron fluoride are treated with isobutylene at 250° C. under a pressure of 250 atmospheres. 59.4% of mono-tertiary-butylaniline and 18.7% of di-tertiary-butylaniline are obtained.

EXAMPLE 13

*O-toluidine, propylene, aluminum chloride*

200 g. of o-toluidine are reacted with 8 g. of aluminum chloride and heated to 300° C. in an autoclave. The propylene introduced up to a pressure of 250 atmospheres is absorbed in a vivacious reaction. By distillation 19.1% of 2-methyl-6-isopropylaniline (B.P. 110° C. under 10 mm. Hg) and 39.7% of a twice propylated o-toluidine (B.P. 134° C. under 10 mm. Hg) are obtained.

EXAMPLE 14

*p-toluidine, propylene, aluminum chloride*

200 g. of p-toluidine are propylated in the manner described in the preceding example and in the presence of the same catalyst. 2,6-diisopropyl-p-toluidine of the B.P. 132–134° C. (10 mm. Hg) is obtained in good yield.

EXAMPLE 15

*Aniline, butylene-1, aluminum chloride*

300 g. of aniline and 12 g. of aluminum chloride are heated to 300° C. Butylene-1 is introduced up to a pressure of 250 atmospheres. After 3 hours the butylene-1 absorption is finished. By fractionating the reaction mixture a mono-secondary-butylaniline and a di-secondary-butylaniline of the B.P. 109° C. and 140° C. respectively (10 mm. Hg) are obtained.

EXAMPLE 16

*Aniline, propylene, aluminum chloride and aluminum*

300 parts of aniline, 6 parts of aluminum chloride and 6 parts of aluminum are heated to 300° C. in an autoclave and propylene is introduced under pressure. The reaction can be perceived very soon by a decrease of pressure. From time to time fresh propylene is added to maintain the pressure. Within 10 hours 88.6% of the aniline are reacted. By rectification 59.0% of 2-isopropylaniline and 27.3% of 2,6-diisopropylaniline are obtained.

EXAMPLE 17

*Aniline, propylene, aluminum chloride and aluminum*

200 parts of aniline are propylated in the presence of 12 parts of aluminum chloride and 4 parts of aluminum in the manner and at the temperature of Example 16. The aniline is quantitatively consumed and 2.09 mols of propylene are absorbed per mol of aniline. By rectification 10.2% of 2-isopropylaniline, 79.2% of 2,6-diisopropylaniline and 5.8% of 2,4,6-triisopropylaniline are obtained.

EXAMPLE 18

*Aniline, propylene, aluminum chloride and aluminum*

300 parts of aniline are propylated in the presence of 12 parts of aluminum chloride and 6 parts of aluminum at 250° C. 0.45 mol of propylene is absorbed per mol of aniline within 4 hours and 38.5% of the aniline are reacted. By distillation 33.6% of 2-isopropylaniline and 3.1% of 2,6-diisopropylaniline are obtained. Liquid and resinous polymerisation products of olefin are not produced. Besides, N-propylation does not take place. The yields are calculated in mol percent referred to the aniline used.

EXAMPLE 19

*Aniline, ethylene, aluminum chloride and aluminum*

18 parts of aluminum chloride are dissolved in 300 parts of aniline and the solution is mixed with 6 parts of aluminum powder. The mixture is heated in an autoclave to 300° C. The formation of aluminum anilide taking place is promoted by the presence of aluminum chloride so that activation with sublimate is not absolutely required. Ethylene is introduced up to a pressure of 200 atmospheres. The reaction is perceptible by a very rapid decrease of pressure. The pressure is maintained by introducing fresh ethylene until the reaction is complete. 2 mols of ethylene are absorbed per mol of aniline within 1½ hours. The reaction product is stirred with water, rendered alkaline with caustic soda solution and fractionated. Besides a small amount of a forerun and an equally small amount of residue, 2,6-diethylaniline is obtained. The yield is 91% of the theoretical.

EXAMPLE 20

*Aniline, ethylene, aluminum chloride and aluminum*

The batch described in Example 19 is treated with ethylene at 250° C. under a pressure of 150–200 atmospheres. 2 mols of ethylene are absorbed per mol of aniline within 2 hours. 2,6-diethylaniline is obtained in a yield of more than 90%.

EXAMPLE 21

*Aniline, ethylene, aluminum chloride and aluminum*

18 g. of aluminum chloride are dissolved in 300 g. of aniline. An aniline-aluminum-chloride complex forms with a substantial evolution of heat. 6 g. of finely divided aluminum are added and the mixture is heated in an autoclave to 300° C. The aluminum dissolves—dissolution is promoted by the aluminum chloride complex—with evolution of hydrogen and formation of an aluminum anilide. By introducing ethylene under pressure about 2 mols of ethylene are absorbed per mol of aniline within 1½ hours and 2,6-diethylaniline is obtained in a yield of 90.8% of the theoretical.

EXAMPLE 22

*Aniline, ethylene, aluminum and aluminum chloride*

6 g. of aluminum powder are heated in an autoclave to 200° C. with 300 g. of aniline and 0.1 to 2 g. of sublimate. The aluminum dissolves with anilide formation. The reaction mixture is cooled, the hydrogen formed allowed to expand, 18 g. of aluminum chloride are added and the mixture is heated to 300° C. The ethylene introduced under pressure is absorbed very rapidly. Within 50 minutes 2 mols of ethylene are added to the aniline. The yield of 2,6-diethylaniline is 92% of the theoretical.

EXAMPLE 23

*Aniline, ethylene, aluminum chloride and aluminum or aluminum alone*

300 g. of aniline are heated in an autoclave to 300° C. with 6 g. of aluminum chloride and 6 g. of aluminum. Ethylene is introduced up to a presure of 200 atmospheres. Ethylene consumption (2.08 mols per mol of amine) is finished after 100–110 minutes. The yield of 2,6-diethylaniline is about 90%.

In a comparison reaction carried out at 300° C., without aluminum chloride 1.84 mols of ethylene are absorbed per mol of aniline within 4 hours. Besides 5.3% of 2-ethyl aniline, 2,6-diethylaniline is obtained in a yield of 86.7%.

EXAMPLE 24

*Aniline, ethylene, tin tetrachloride and aluminum*

300 g. of aniline are heated to 300° C. with 6 g. of aluminum and 6 g. of tin tetrachloride and then treated with ethylene under a pressure of 200 atmospheres. Within 100 minutes 2 mols of ethylene are absorbed per mol of aniline and 96% of 2,6-diethylaniline are obtained.

EXAMPLE 25

*Aniline, ethylene, zinc chloride and aluminum*

Instead of tin tetrachloride 2% of zinc chloride are used in the reaction of Example 24. The yield of 2,6-diethylaniline is 83.3% of the theoretical; besides, 6.9% of 2-ethylaniline are obtained.

EXAMPLE 26

*Aniline, ethylene, boron fluoride and aluminum*

The process of Example 24 is repeated, however, the catalyst is replaced by 2% by weight of boron fluoride and 2% by weight of aluminum. 2,6-diethylaniline is obtained in good yield as well as a small amount of 2-ethylaniline.

EXAMPLE 27

*Aniline, ethylene, titanium tetrachloride and aluminum*

When carrying out the process of Example 24, using 2% by weight of titanium tetrachloride and 2% by weight of aluminum, calculated on the amine, 1.96 mols of ethylene are absorbed per mol of aniline. Besides 3% of 2-ethylaniline, 87.5% of 2,5-diethylaniline are obtained.

EXAMPLE 28

*Aniline, ethylene, silicon tetrachloride and aluminum*

When carrying out the process of Example 27 using however 2% by weight of silicon tetrachloride instead of titanium tetrachloride, 2.05 mols of ethylene are consumed per mol of aniline and 95.5% of 2,6-diethylaniline are obtained, the aniline used being completely reacted.

EXAMPLE 29

*Aniline, ethylene, vanadium trichloride and aluminum*

300 g. of aniline, 18 g. of vanadium trichloride and 6 g. of finely divided aluminum are heated in an autoclave to 300° C. The ethylene introduced up to a pressure of 200 atmospheres is absorbed rapidly. The reaction is complete in 1½ hours. 1.85 mols of ethylene are consumed per mol of aniline. 2,6-diethylaniline is obtained in a yield of 85% of the theoretical.

EXAMPLE 30

*Aniline, butylene-1, aluminum chloride and aluminum*

200 g. of aniline are mixed with 12 g. of aluminum chloride and 4 g. of aluminum and heated in an autoclave to 300° C. Butylene-1 is introduced by means of a high-pressure pump up to a pressure of 250 atmospheres. The reaction can be perceived very soon by a decrease of pressure. By working up the reaction mixture a butylaniline of the B.P. 108–110° C. (10 mm. Hg) and a dibutylaniline of the B.P. 140° C. (10 mm. Hg) are obtained.

EXAMPLE 31

*Aniline, isobutylene, aluminum chloride and aluminum*

200 g. of aniline are heated in an autoclave to 200° C. with 12 g. of aluminum chloride and 4 g. of aluminum. Thereupon isobutylene is introduced under pressure. 0.53 mol of the olefin is consumed per mol of aniline within 6 hours. The sole reaction product is mono-tertiary-butylaniline (B.P. 104° C. under 10 mm. Hg) which is obtained in a yield of 47.4% of the theoretical besides unchanged aniline.

EXAMPLE 32

*Aniline, isobutylene, boron fluoride and aluminum*

200 g. of aniline are heated to 200° C. in the presence of 8 g. of boron fluoride and 4 g. of aluminum, and treated under pressure with isobutylene. 1.48 mols of isobutylene are consumed in 4 hours and 30.9% of mono-tertiary-butylaniline and 29.8% of di-tertiary butylaniline are obtained.

EXAMPLE 33

*O-toluidine, ethylene, aluminum chloride and aluminum*

300 g. of o-toluidine are mixed with 6 g. of aluminum chloride and 6 g. of aluminum and heated in an autoclave to 300° C. Ethylene is introduced and consumed rapidly. 1.06 mols of ethylene are absorbed per mol of amine in 2 hours. 2-methyl-6-ethylaniline (B.P. 102° C. under 10 mm. Hg) is obtained in a yield of 87.4% of the theoretical.

EXAMPLE 34

*O-toluidine, propylene, aluminum chloride and aluminum*

300 g. of o-toluidine are heated to 300° C. with 12 g. of aluminum chloride and 6 g. of aluminum. Propylene is introduced and absorbed rapidly with the formation of 2-methyl-6-isopropylaniline. The yield is 73.0%; B.P.: 108–110° C. at 10 mm. Hg.

EXAMPLE 35

*M-toluidine, ethylene, boron fluoride and aluminum*

300 g. of m-toluidine are ethylated in the manner described in Example 32. 1.91 mols of ethylene are absorbed per mol of amine within 1 hour and 3-methyl-2,6-diethylaniline (B.P. 125° C. under 10 mm. Hg) is obtained in a yield of 92.8%.

EXAMPLE 36

*P-toluidine, ethylene, boron fluoride and aluminum*

P-toluidine is ethylated by the process of Example 35. 2 mols of ethylene are consumed per mol of amine and 94.4% of 4-methyl-2,6-diethylaniline (B.P. 122° C. at 10 mm. Hg) are obtained.

EXAMPLE 37

*P-toluidine, ethylene, boron fluoride and aluminum*

200 g. of p-toluidine are heated to 280° C. with 12 g. of aluminum chloride and 4 g. of aluminum. Propylene is introduced and absorbed rapidly. By rectifying the reaction mixture 4-methyl-2,6-diisopropylaniline of the B.P. 132–133° C. (10 mm. Hg) is obtained in a yield of 66.1%.

EXAMPLE 38

*2,4-toluylene-diamine, ethylene, aluminum chloride and aluminum anilide*

200 parts of 2,4-toluylene-diamine are heated in an autoclave to 280° C. with 8 parts of an hydrous aluminum chloride and 150 parts of a solution of aluminum anilide in aniline (containing 2% aluminum) and ethylene is troduced up to a pressure of 200 atmospheres. The olefin is absorbed very rapidly. After the pressure has dropped to 100–150 atmospheres fresh ethylene is introduced. After 100 parts of ethylene are absorbed the reaction velocity slows down considerably. By interrupting the ethylation, 70% of the aniline used is recovered unchanged upon working up the reaction mixture. The rest consists of 2-ethylaniline. 95% of the 2,4-toluylene-diamine used as starting product are converted to 1-methyl-3,5-diethylphenylene-diamine-(2,4). The diamine obtained is present as a light-yellow viscous liquid of the B.P. 150–155° C. at 5 mm. Hg. The diacetyl compound yields colorless needles of the M.P. 310–311° C.

If ethylation is not stopped and the reaction is allowed to be completed, 50 parts of ethylene are additionally absorbed and consumed for the formation of 2-ethylaniline. The reaction mixture is worked up by stirring with aqueous caustic soda solution to remove the catalyst and by subsequent fractional distillation of the amines.

The aluminum anilide solution used in this example can easily be prepared by heating aniline with aluminum up to the B.P. of the amine with evolution of hydrogen.

EXAMPLE 39

*2,6-toluylene diamine, ethylene, aluminum chloride and aluminum anilide*

According to the process of the preceding Example 38, 200 parts of 2,6-toluylene diamine are reacted at 280° C. with ethylene together with 150 parts of the anilide solution and 8 parts of aluminum chloride. Ethylene absorption proceeds very rapidly but is essentially slowed down after 2 mols of olefin are reacted per mol of diamine. By interrupting the reaction at this stage and working up the mixture as described in Example 38, the greater part of the aniline is unchanged and the diamine converted into 1-methyl-3,5-diethylphenylene diamine-(2,6) in a quantitative yield. The diamine obtained boils at 152–155° C. and 5 mm. Hg as a colorless oil which solidifies at 58° C. The diacetyl compound crystallizes in colorless needles of the M.P. 324–326° C. By further treatment with ethylene the aniline is converted to 2-ethylaniline and finally to 2,6-diethylaniline.

EXAMPLE 40

*Tolamine, ethylene, aluminum chloride and aluminum anilide*

200 parts of technical tolamine (consisting of about 70% of 2,4-toluylene-diamine and 30% of 2,6-toluylene-diamine) are reacted with ethylene at 280–300° C. according to the process of Example 38 in the presence of 8 parts of aluminum chloride and 150 parts of the aluminum anilide solution. The reaction proceeds in the manner described in Examples 38 and 39. The diamines react to form the corresponding diethyl derivatives (yield: 95% of the theoretical). The mixture of these diethylated diamines boils at 5 mm. Hg and 150–154° C. as light-yellow oil. The monoamine proportion of the reaction mixture consists of aniline, 2-ethylaniline and 2,6-diethylaniline in varying proportions depending upon the time of ethylation.

EXAMPLE 41

*2,4-toluylene diamine and aniline, ethylene, aluminum chloride, aluminum and mercury chloride*

1000 parts of a mixture of 80% of 2,4-toluylene diamine and 20% of aniline are heated in the autoclave to 280–300° C. in the presence of 15 parts of aluminum, 20 parts of aluminum chloride and 0.8 part of mercury chloride, the aluminum being dissolved with evolution of hydrogen. By pressing in ethylene up to a pressure of 200 atmospheres the ethylene is absorbed very rapidly. After absorption of 400 parts of ethylene, the reaction velocity decreases essentially. The 2,4-toluylene diamine is converted to 1-methyl-3,5-diethyl-phenylene diamine-(2,4) in a yield of 95%. 60% of the aniline used remain unchanged. The rest has been converted into the 2-ethyl-aniline.

EXAMPLE 42

*2,6-toluylene diamine and aniline, ethylene, aluminum chloride, aluminum and mercury chloride*

According to the process of Example 41, a mixture of 20% of aniline and 80% of 2,6-toluylene diamine is reacted with ethylene at 280° C. in the presence of the catalysts described in this example. 1-methyl-3,5-diethyl-phenylene diamine-(2,6) is obtained in almost quantitative yield apart from varying amounts of 2-ethyl aniline and 2,6-diethylaniline, depending on the reaction time.

EXAMPLE 43

*2,6-toluylene diamine, ethylene, aluminum chloride, aluminum and mercury chloride*

300 parts of 2,6-toluylene diamine are heated in the autoclave to 280° C. together with 6 parts of finely divided aluminum, 8 parts of anhydrous aluminum chloride and 0.2 part of mercury chloride. As soon as the resultant hydrogen pressure indicates the formation of substituted aluminum amide, ethylene is introduced under pressure (100–200 atmospheres). The reaction proceds at very high velocity and leads to the formation of 1-methyl-3,5-diethyl-phenylene diamine-(2,6) in a quantitative yield. After extracting the reaction product with dilute caustic soda solution at 60–80° C. the diamine obtained shows a solidifaction point of 52° C. which is increased to 58° C. after distillation.

EXAMPLE 44

*Diphenylamine, ethylene, aluminum chloride and aluminum anilide solution*

200 parts of diphenylamine are treated with ethylene under a pressure of 200 atmospheres at 280° C. together with 150 parts of an aluminum anilide solution (containing 2% of aluminum) and 8 parts of anhydrous aluminum chloride. When the pressure has dropped to 100–150 atmospheres, fresh ethylene is introduced. 160 parts of ethylene are absorbed within 1½ hours. To the liquid reaction product dilute caustic soda solution is added and the amine mixture fractionated.

At first, 2,6-diethylaniline is obtained in a yield of 95% of the theoretical. The diphenyl amine has been entirely converted to diethyl-diphenyl amine which boils at 159° C. and 5 mm. Hg as weakly yellow oil (B.P. 173–174° C. and 10 mm. Hg). The yield is 93% of the theoretical.

Calculated for $C_{16}H_{19}N$ (225.32): C, 85.28%; H, 8.50%; N, 6.22%. Found: C, 84.87%; H, 8.30%; N, 6.16%.

The nitrosamine which is obtainable from this amine in the usual manner forms light-brown leaflets of the M.P. 63–65° C.

Calculated for $C_{16}H_{18}ON_2$ (254.32): C, 75.56%; H, 7.13%; N, 11.02%. Found: C, 75.55%; H, 6.85%; N, 10.93%.

The nitrosamine can be rearranged with hydrogen chloride in a mixture of alcohol and ether into 4-nitroso compound (M.P. 100–102° C.). Upon alkaline hydrolysis this nitroso compounds yield o-ethylaniline. This proves that one ethyl group has entered the 2-position of the diphenyl amine and that the second ethyl group is attached at the other nucleus, either in 2- or 3-position. Since as far as we know m-substitution does not occur in the nuclear alkylation carried out in the presence of aluminum catalysts the amine of the B.P. 159° C. at 5 mm. Hg is 2,2′-diethyl-diphenylamine. This constitution is confirmed by the ultrared spectrum.

EXAMPLE 45

*Diphenyl amine and aniline, ethylene, aluminum chloride, aluminum, mercuric chloride*

800 parts of diphenyl amine, 200 parts of aniline, 15 parts of aluminum powder, 18 parts of aluminum chloride and 0.5 part of mercuric chloride are reacted with ethylene in the autoclave at 280–300° C. The ethylene pressure is maintained at 150–200 atmospheres by introducing fresh ethylene from time to time. 390–400 parts of ethylene are absorbed within 90 minutes. The reaction product is stirred with caustic soda solution in order to remove the catalyst, the organic layer separated and fractionally distilled. The reaction product substantially consists only of 2,6-diethylaniline (yield: 95% of the theoretical) and 2,2′-diethyl-diphenylamine of the B.P. 159° C. at 5 mm. Hg (yield: 92% of the theoretical).

EXAMPLE 46

*Aniline, ethylene, aluminum chloride, sodium*

18 parts of aluminum chloride are dissolved in 300 parts of aniline, and 6 parts of metallic sodium are added. The mixture is fed into a high-pressure autoclave, the air is expelled with ethylene, the mixture heated to 300° C. and ethylene is introduced up to 200 atmospheres. The ethylene pressure drops immediately and fresh ethylene is introduced from time to time to maintain the original pressure. The reaction mixture is worked up by shaking with dilute caustic soda solution, separating and fractionating in vacuo. 2,6-diethylaniline distills over at 110° C. and 10 mm. Hg in a yield of 82.9% of the theoretical. The forerun contains a small amount of 2-ethylaniline. The residue contains higher boiling amines; aniline is not recovered so that the aniline used is reacted quantitatively.

EXAMPLE 47

*Aniline, ethylene, aluminum chloride and sodium-aniline product*

The process of Example 46 is repeated, using however instead of metallic sodium, 75 parts of a solution prepared from 24 parts of sodium and 300 parts of aniline in known manner. The reaction product substantially consists of 2,6-diethylaniline. The yields correspond to those of the preceding example.

EXAMPLE 48

*Aniline, ethylene, aluminum chloride, sodium*

300 parts of aniline are heated in an autoclave to 300° C. with 24 parts of aluminum chloride and 9 parts of sodium. Ethylene is introduced under pressure. 1.87 mols of ethylene are absorbed per mol of aniline within 100 minutes. Upon working up by distillation 1.7% of 2-ethylaniline and 90.4% of 2,6-diethylaniline are obtained. All the yields are calculated on the theoretical. Nitrogen-substituted amines are not formed.

EXAMPLE 49

*Aniline, ethylene, aluminum chloride, lithium*

300 parts of aniline are heated in an autoclave to 300° C. with 18 parts of aluminum chloride and 1.9 parts of lithium. Ethylene is introduced up to a pressure of 200 atmospheres. 1.9 mols of ethylene are absorbed per mol of aniline within 4 hours. Besides a small amount of 2-ethylaniline, 2,6-diethylaniline is obtained in a yield of 89.4%. Secondary and tertiary amines are not formed.

EXAMPLE 50

*Aniline, ethylene, aluminum chloride and potassium*

The process of Example 49 is repeated but 10 parts of potassium are used instead of lithium. 1.15 mols of ethylene are absorbed per mol of aniline within 4 hours. 89.3% of the aniline are reacted and 39.1% of 2-ethylaniline and 41.8% of 2,6-diethylaniline are obtained.

EXAMPLE 51

*Aniline, ethylene, aluminum chloride and magnesium*

300 parts of aniline, 18 parts of aluminum chloride and 6 parts of magnesium are heated in an autoclave to 300° C. and treated with ethylene under pressure. 2-ethylaniline is obtained in a yield of 40.6% and 2,6-diethylaniline in a yield of 12.3%.

EXAMPLE 52

*Aniline, ethylene, aluminum chloride and calcium*

The process of Example 51 is repeated but 6 parts of calcium are used instead of magnesium. 12.3% of 2-ethylaniline and 74.3% of 2,6-diethylaniline are obtained.

EXAMPLE 53

*Aniline, ethylene, aluminum chloride and calcium hydride*

The process of Example 51 is repeated but 6 parts of calcium hydride are used instead of magnesium. Ethylene absorption is 1.93 mols per mol of aniline at 300° C. 86% of 2,6-diethylaniline are obtained.

EXAMPLE 54

*Aniline, ethylene, aluminum chloride and calcium carbide*

300 parts of aniline are heated in an autoclave to 300° C. together with 18 parts of aluminum chloride and 7 parts of finely pulverized calcium carbide. Ethylene is introduced up to a pressure of 200 atmospheres. By distillation 21.6% of 2-ethylaniline are obtained besides a larger quantity of unchanged aniline.

EXAMPLE 55

*Aniline, ethylene, aluminum chloride and sodium*

300 parts of aniline, 18 parts of aluminum chloride and 6 parts of sodium are heated in an autoclave to 300° C. and treated with ethylene under a pressure of 200 atmospheres. The reaction is complete in 1½ hours. 1.84 mols of ethylene are absorbed per mol of amine. 2,6-diethylaniline is obtained in a yield of 90.6%.

EXAMPLE 56

*O-toluidine, ethylene, aluminum chloride and sodium*

300 parts of o-toluidine are heated in an autoclave to 300° C. together with 18 parts of aluminum chloride and 6 parts of sodium and treated with ethylene under a pressure of 200 atmospheres. 0.93 mol of ethylene is absorbed per mol of amine within 1½ hours. 2-methyl-6-ethyl aniline is obtained in a yield of 92.5%.

EXAMPLE 57

*M-toluidine, ethylene, aluminum chloride and sodium*

M-toluidine is reacted with ethylene under the conditions and in the presence of the catalysts of Example 56. Besides 21.2% of 3-methyl-2-ethylaniline, 71.4% of 3-methyl-2,6-diethylaniline are obtained in 1½ hours.

EXAMPLE 58

*P-toluidine, ethylene, aluminum chloride and aluminum*

300 parts of p-toluidine are heated to 300° C. together with 24 parts of aluminum chloride and 9 parts of aluminum and treated with ethylene up to a pressure of 200 atmospheres. The reaction product consists exclusively of 4-methyl-2,6-diethylaniline which is obtained in a yield of 92.5%.

If the reaction is stopped after 0.8 mol of ethylene is consumed per mol of aniline, 44% of 4-methyl-2-ethylaniline and 18% of 4-methyl-2,6-diethylaniline are obtained by distillation.

EXAMPLE 59

*Symoxylidine, ethylene, aluminum chloride and aluminum*

By treating symoxylidine with ethylene under the conditions and in the presence of the catalysts of Example 58, 3,5-dimethyl-2,6-diethylaniline is obtained in good yield.

EXAMPLE 60

*Aniline, propylene, aluminum chloride and sodium*

200 parts of aniline are heated in an autoclave to 300° C. in the presence of 18 parts of aluminum chloride and 6 parts of sodium. Propylene is introduced by means of a high-pressure pump up to a pressure of 250 atmospheres. By working up the reaction product, 2-isopropylaniline is obtained in a yield of 38.4% and 2,6-diisopropylaniline in a yield of 17.8%.

EXAMPLE 61

*Aniline, isobutylene, aluminum chloride and sodium*

By repeating the process of Example 60 under equal conditions, replacing, however, propylene by isobutylene, 42.5% of a mono-tertiary-butylaniline and 5.3% of a di-tertiary-butylaniline are obtained.

EXAMPLE 62

*Aniline, cyclohexene, aluminum chloride and aluminum*

A mixture of 186 parts of aniline, 164 parts of cyclohexene, 18 parts of aluminum chloride and 6 parts of a coarse aluminum powder are heated in an autoclave to 300° C. The pressure rises at first to about 73 atmospheres and drops thereafter to about 49 atmospheres within 4 hours. Thereupon the reaction product is shaken with dilute sodium hydroxide solution and the organic phase being separated and distilled. Thereby 2-cyclohexylaniline is obtained; B.P. 153° C. at 10 mm. Hg (the acetyl compound melts at 101–102° C.).

*N-analysis.*—Calculated: 7.99%. Found: 7.91%.

Furthermore a second fraction consisting of dicyclohexylaniline is obtained; B.P. 212–213° C. at 7 mm. Hg.

*N-analysis.*—Calculated: 5.44%. Found: 5.51%.

It will be appreciated that aluminum may be employed in the catalyst of the reaction not only in pure metallic form but also in impure form as well as in the form of alloys of aluminum. Thus, where the term "aluminum" is used in the application and the claims, it is meant to include and define not only pure metallic aluminum, but also aluminum in impure form as well as aluminum in the form of alloys.

Further, as will be apparent from Example 53 and Example 54, in the use of aluminum and alkali and alkaline earth metals, compounds which provide these metals such as hydrides and carbides can be used.

In the alkylation of aromatic amines for alkylation of the nucleus, there can advantageously be used as catalyst for the reaction aluminum or aluminum compounds of aromatic amines in combination with iodine or iodine compounds in which the iodine has a weaker hyeteropolar bond than in the alkali metal or alkaline earth metal iodides. Particularly effective are the iodine compounds of the elements of the III to VIII group of the periodic system of the elements, or especially, the metal compounds, such as, for example nickel iodide ($NiI_2$), cobalt iodide ($CoI_2$), aluminum iodide ($AlI_3$), lead iodide ($PbI_2$). The iodides of the metals of the VIII Group are preferred. It is, however, possible to use compounds of iodine with non-metal elements, such as for example phosphorous tri-iodide. The combination of aluminum powder and iodine or iodide can be used in the proportions of about 2–3 parts aluminum powder per part of iodide or iodine, and the aluminum powder can be in the order of about 2% of the weight of the aromatic amine. The reaction mixture can contain about 0.1–1% of iodine or iodine compounds, based on the amine to be alkylated. Though amounts outside this range can be used, this is a preferred range. If desired, iodine compounds or iodine as is described here can be used in combination with Friedel-Crafts catalysts according to the instant invention.

Where iodine is used, a small amount of sublimate can be employed, for example about 10% sublimate on the iodine or iodide.

For the nuclear alkylation of aromatic amines, there is also to be considered, as a catalyst, bleaching earths. Mixtures of bleaching earths with aluminum or aluminum compounds of aromatic amines can be used as the catalyst. The bleaching earth is advantageously used in combination with finely granulated aluminum. The aluminum can be about 2% by weight of the aromatic amine, and the bleaching earth can be about 2–10% by weight of the aromatic amine. Sublimate, in amount of in the order of 3% on the aluminum, can be used. As is indicated in Example 11 above, bleaching earth can be used in combination with Friedel-Crafts catalysts according to the invention.

Also, for consideration as a catalyst for the alkylation of aromatic amines are the aluminum anilides wherein the aluminum anilide is present in solution with the aromatic amine to be alkylated and the amount of aluminum anilide is about 1–12% of aluminum based on the aromatic amine. Larger amounts of analide, for example 15% and even higher, can be used. In the utilization of such catalysts, the aluminum anilide can be added to the aromatic amine to provide the reaction medium. As is indicated in many of the above examples, aluminum anilides as are described here can be used in combination with Friedel-Crafts catalysts according to the invention.

What is claimed is:

1. Process for production of nuclearly alkylated aromatic amines, which comprises reacting an olefin selected from the group consisting of aliphatic olefinic hydrocarbon and cycloolefinic hydrocarbon with an aromatic amine selected from the group consisting of primary and secondary aromatic amines at a temperature of about 150–400° C. in the presence of a Friedel-Crafts catalyst.

2. Process according to claim 1, wherein the catalyst comprises a compound selected from the group consisting of aluminum chloride, aluminum bromide, iron chloride, boron fluoride, zinc chloride, tin tetrachloride, vanadium-trichloride, silicon-tetrachloride and titanium-tetrachloride.

3. Process according to claim 1, wherein the catalyst comprises aluminum chloride.

4. Process according to claim 1, wherein the catalyst includes in addition to the Friedel-Crafts catalyst a material selected from the group consisting of aluminum, lithium, sodium, potassium, rubidium, cesium, barium, calcium, strontium and magnesium.

5. Process according to claim 1, wherein the catalyst includes in addition to the Friedel-Crafts catalyst, a bleaching earth.

6. Process according to claim 1, wherein the olefin is a lower aliphatic olefin.

7. Process according to claim 1, wherein the olefin is a cycloolefin.

8. Process according to claim 1, wherein the aromatic amine is selected from the group consisting of unsubstituted, and alkyl substituted primary and secondary amines.

9. Process for production of nuclearly alkylated aromatic amines, which comprises reacting an olefin selected from the group consisting of aliphatic olefinic hydrocarbon and cycloolefinic hydrocarbon olefins with an amine selected from the group consisting of unsubstituted, and alkyl substituted primary and secondary aromatic amines, at a temperature of about 150–400° C. in the presence of aluminum chloride catalyst.

10. Process according to claim 9, wherein the aromatic amine is aniline.

11. Process according to claim 9, wherein the aromatic amine is o-toludine.

12. Process according to claim 9, wherein the aromatic amine is toluylene diamine.

13. Process according to claim 9, wherein the aromatic amine is diphenylamine.

14. Process according to claim 9, wherein the aromatic amine is sym. xylidine.

15. Process according to claim 9, wherein the aromatic amine is benzidine.

16. Process according to claim 9, wherein the olefin is ethylene.

17. Process according to claim 9, wherein the olefin is propylene.

18. Process according to claim 9, wherein the olefin is butylene-1.

19. Process according to claim 9, wherein the olefin is isobutylene.

20. Process according to claim 9, wherein the olefin is cyclohexene.

21. Process according to claim 9, wherein the olefin is a lower aliphatic olefin.

22. Process according to claim 10, wherein the olefin is a lower aliphatic olefin.

23. Process according to claim 16, wherein the amine is aniline.

24. Process according to claim 1, wherein the pressure is about 50–300 atmospheres.

References Cited by the Examiner

UNITED STATES PATENTS

| | | | |
|---|---|---|---|
| 2,115,884 | 5/1938 | Schollkopf | 260—577 |
| 2,759,030 | 8/1956 | Schmerling | 260—578 |
| 2,762,845 | 9/1956 | Stroh et al. | 260—577 |
| 2,814,646 | 11/1957 | Kolka et al. | 260—577 |

CHARLES B. PARKER, *Primary Examiner.*

D. R. MAHANAND, *Assistant Examiner.*